Sept. 24, 1935. LA DELPHIA SHINN 2,015,607
PARKING STALL FOR VEHICLES
Filed June 19, 1933    8 Sheets-Sheet 1

La Delphia Shinn, INVENTOR

BY Victor J. Evans and Co. ATTORNEY

Sept. 24, 1935.    LA DELPHIA SHINN    2,015,607
PARKING STALL FOR VEHICLES
Filed June 19, 1933    8 Sheets-Sheet 2

La Delphia Shinn
INVENTOR
BY Victor J. Evans and Co. ATTORNEY

WITNESS:

Sept. 24, 1935.  LA DELPHIA SHINN  2,015,607
PARKING STALL FOR VEHICLES
Filed June 19, 1933    8 Sheets-Sheet 3

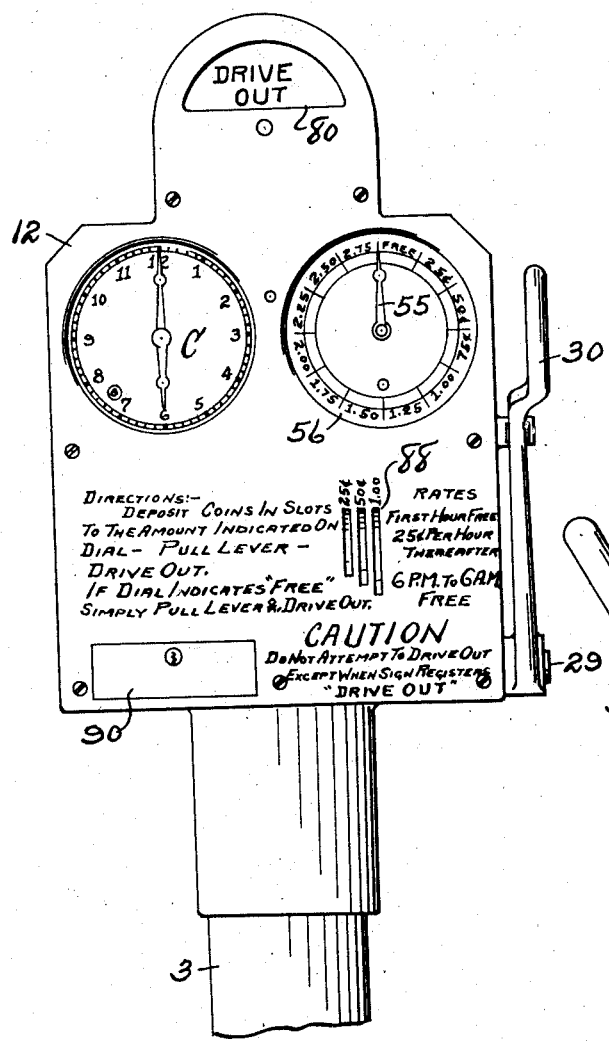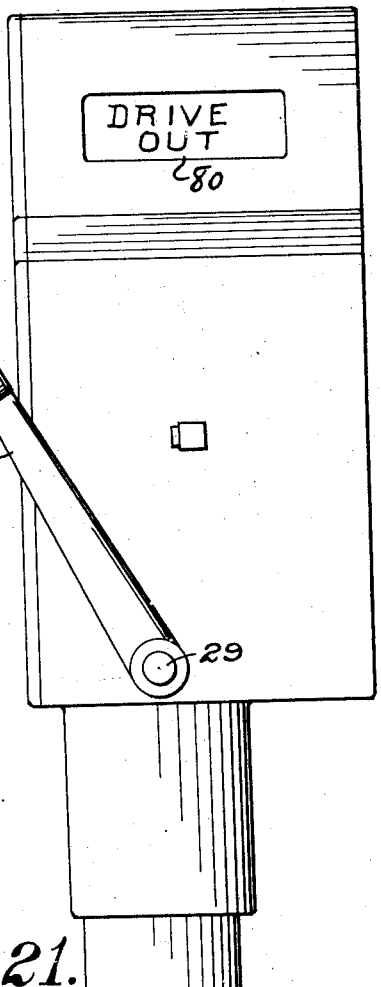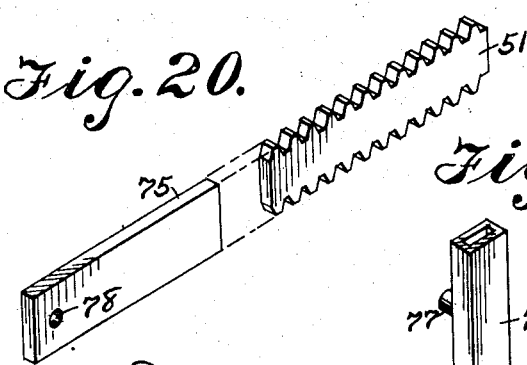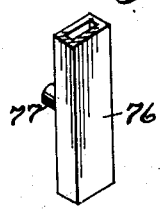

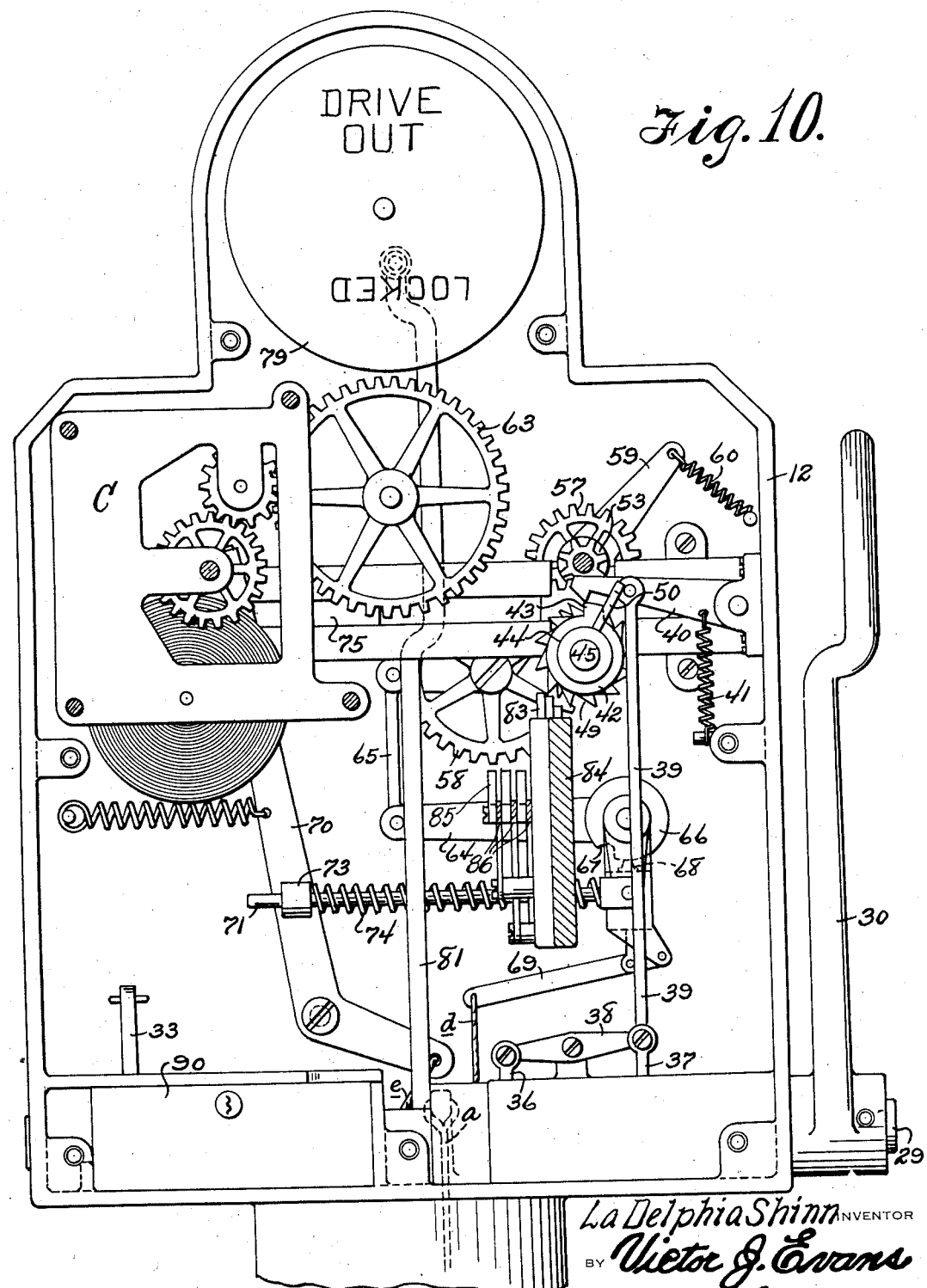

Sept. 24, 1935.  LA DELPHIA SHINN  2,015,607
PARKING STALL FOR VEHICLES
Filed June 19, 1933    8 Sheets-Sheet 6

La Delphia Shinn
INVENTOR

BY Victor J. Evans
and Co.  ATTORNEY

WITNESS:

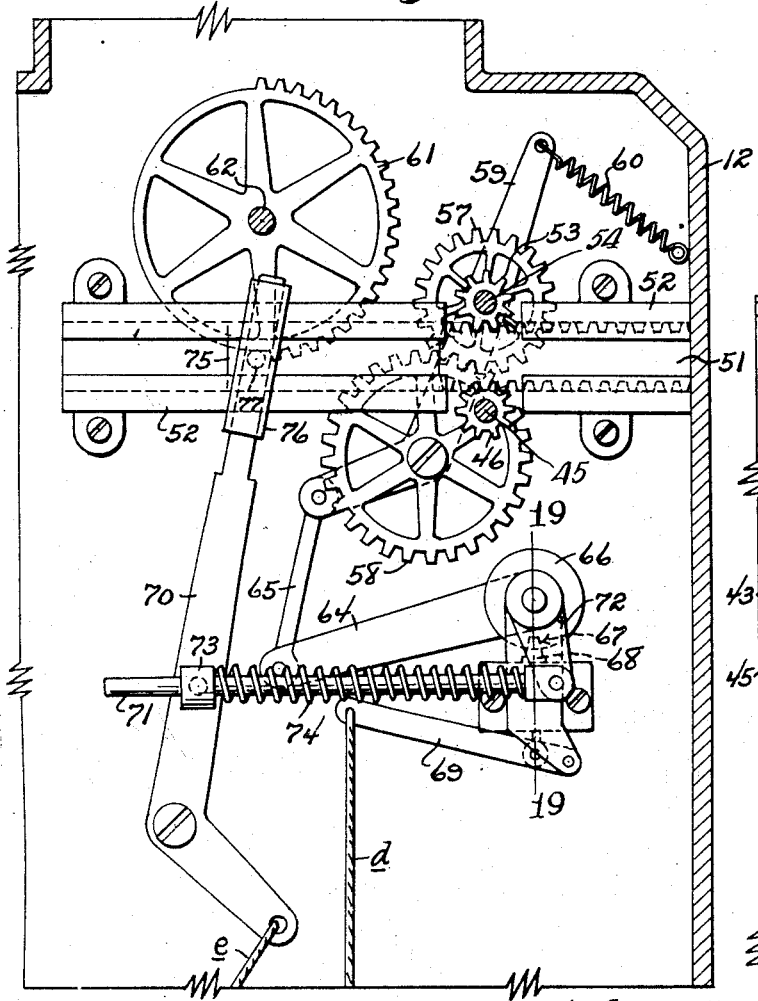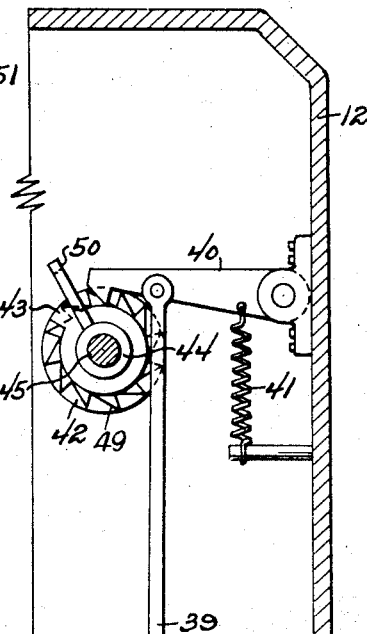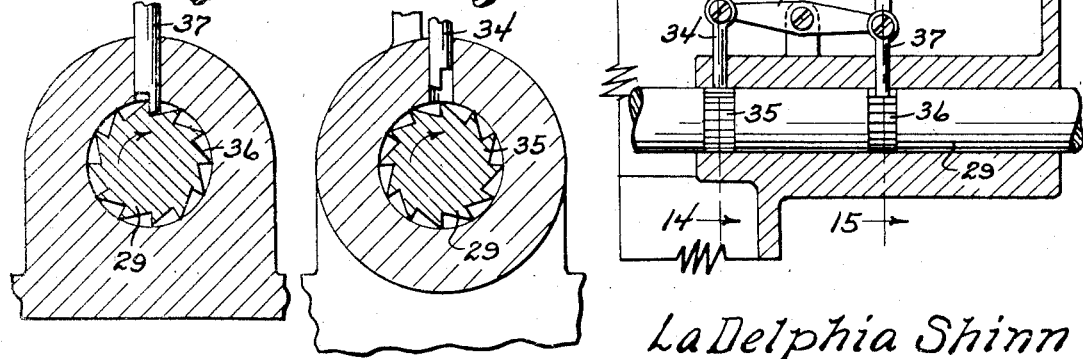

Sept. 24, 1935.  LA DELPHIA SHINN  2,015,607

PARKING STALL FOR VEHICLES

Filed June 19, 1933    8 Sheets-Sheet 8

La Delphia Shinn INVENTOR

BY Victor J. Evans and Co. ATTORNEY

WITNESS:

Patented Sept. 24, 1935

2,015,607

UNITED STATES PATENT OFFICE 2,015,607

PARKING STALL FOR VEHICLES

La Delphia Shinn, Albuquerque, N. Mex.

Application June 19, 1933, Serial No. 676,565

13 Claims. (Cl. 194—1)

This invention relates to a parking system for automobiles and other vehicles, the general object of the invention being to provide a gate or barrier for closing the stall and which is locked in closed position automatically by a vehicle entering the stall, with coin operated means associated with manually operated means for opening the barrier or gate to permit the vehicle to leave the stall.

Another object of the invention is to provide a clock operated meter for indicating the amount of money due for the parking charge, with means for starting the operation of the meter as soon as a vehicle enters the stall, with means operated by the vehicle leaving the stall for returning the meter parts to zero position.

A further object of the invention is to provide means associated with the dial for informing the driver of the vehicle when the barrier is locked and when the parts are in position to permit the vehicle to leave the stall.

Another object of the invention is to so arrange the parts that the vehicle can occupy the stall for a certain length of time and then be moved out of the stall without the payment of a fee.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 8 is a front view of the casing which contains the meter, the clock and their associated parts.

Figure 9 is a side view of Figure 8.

Figure 10 is an enlarged view of the casing, with its front removed.

Figure 12 is a vertical sectional view through Figure 11, showing the means for operating the meter and its associated parts from the block mechanism.

Figure 13 is a vertical sectional view through Figure 11, showing the means for controlling the movement of the lever operated shaft.

Figure 14 is a section on line 14—14 of Figure 13.

Figure 15 is a section on line 15—15 of Figure 13.

Figure 20 is a view of the rack bar and the block for returning the rack bar to normal position.

Figure 21 is a view of the tubular part and its projection which engages the block and which fits over the upper end of the operating lever.

Figure 1:
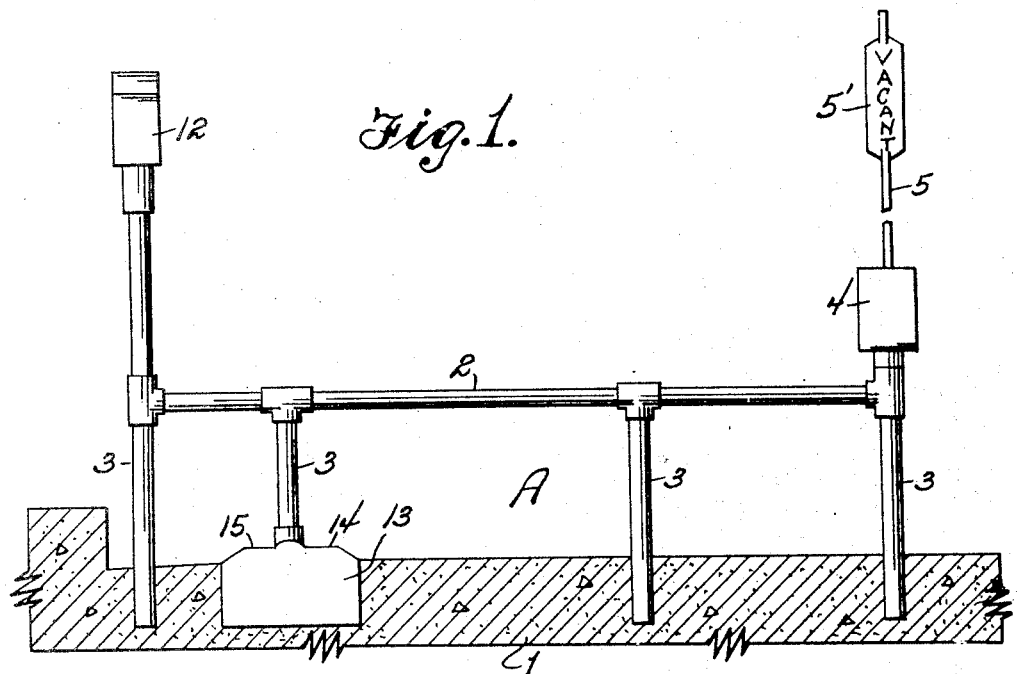
Figure 1 is a side view of a stall, with the base in section.
Figure 2:
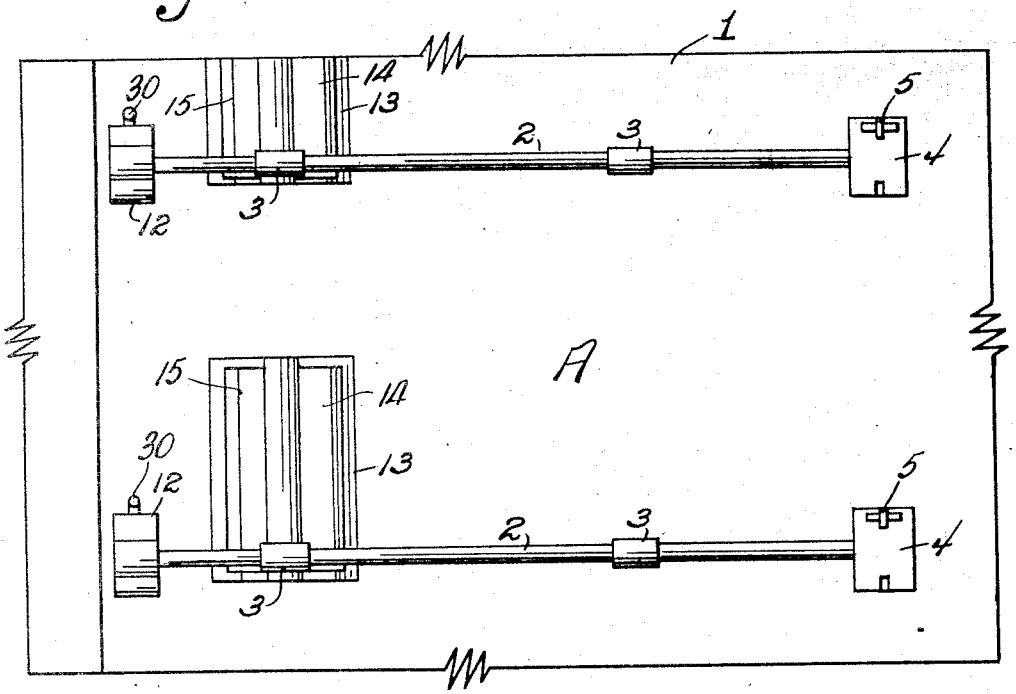
Figure 2 is a plan view of Figure 1.
Figure 3:
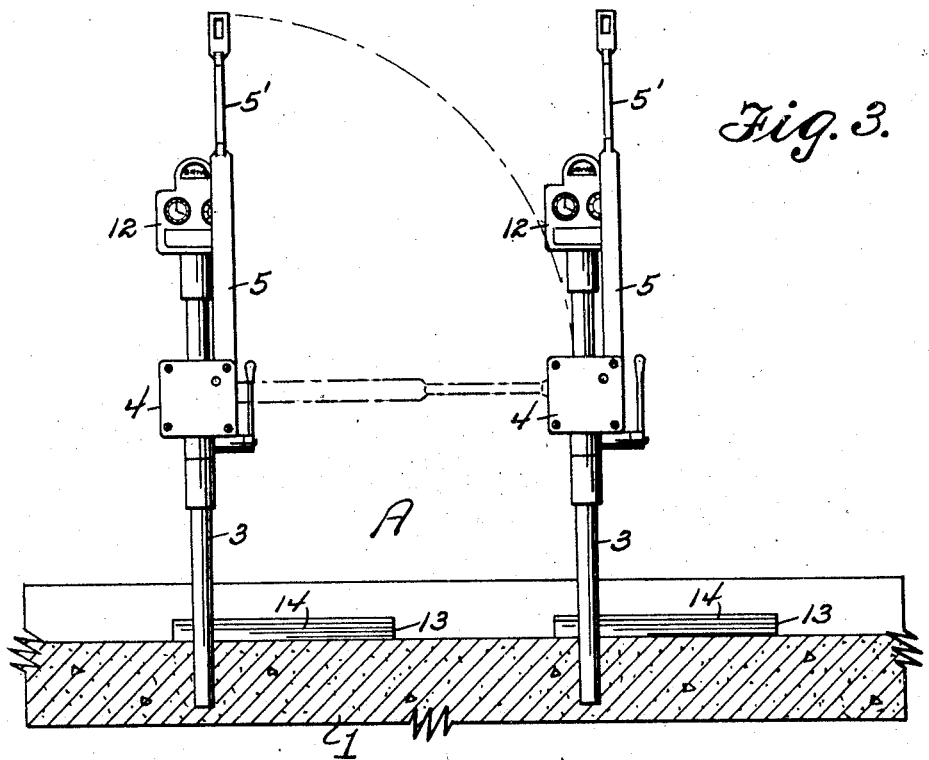
Figure 3 is a front end view of a stall, with the base in section.
Figure 4:
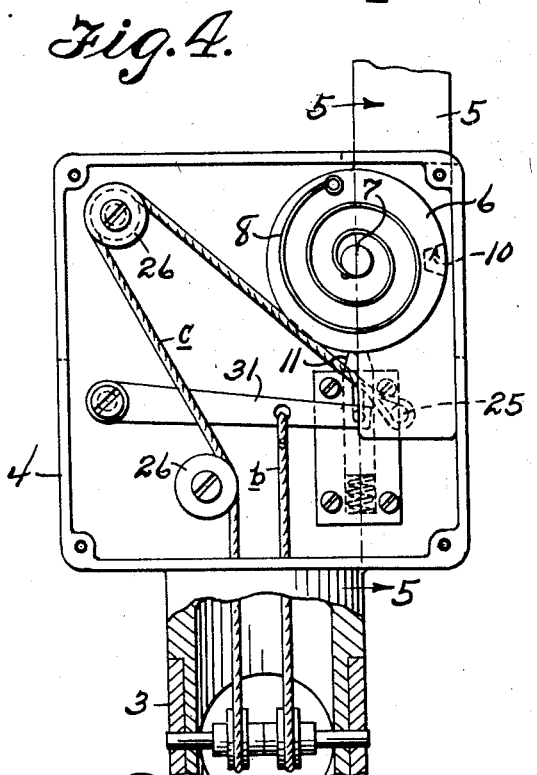
Figure 4 is a vertical sectional view through the upper end of the gate post.
Figure 5:
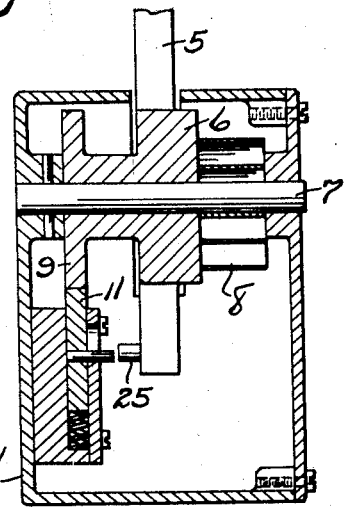
Figure 5 is a section on line 5—5 of Figure 4.
Figure 6:
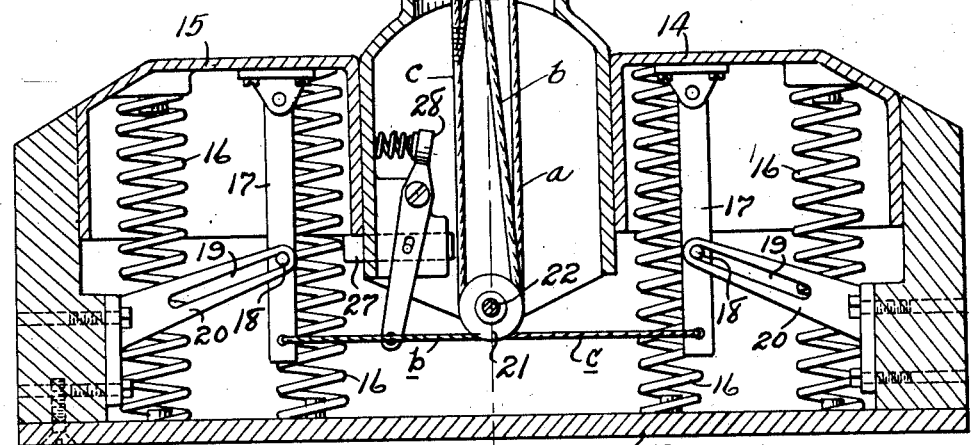
Figure 6 is a transverse sectional view through the vehicle operated means and through one of the posts and parts of the top rail.
Figure 7:
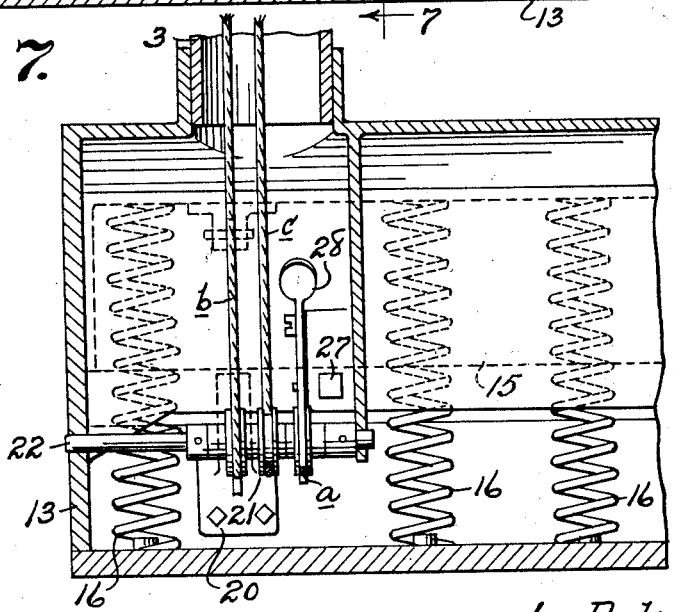
Figure 7 is a section on line 7—7 of Figure 6.
Figure 11:
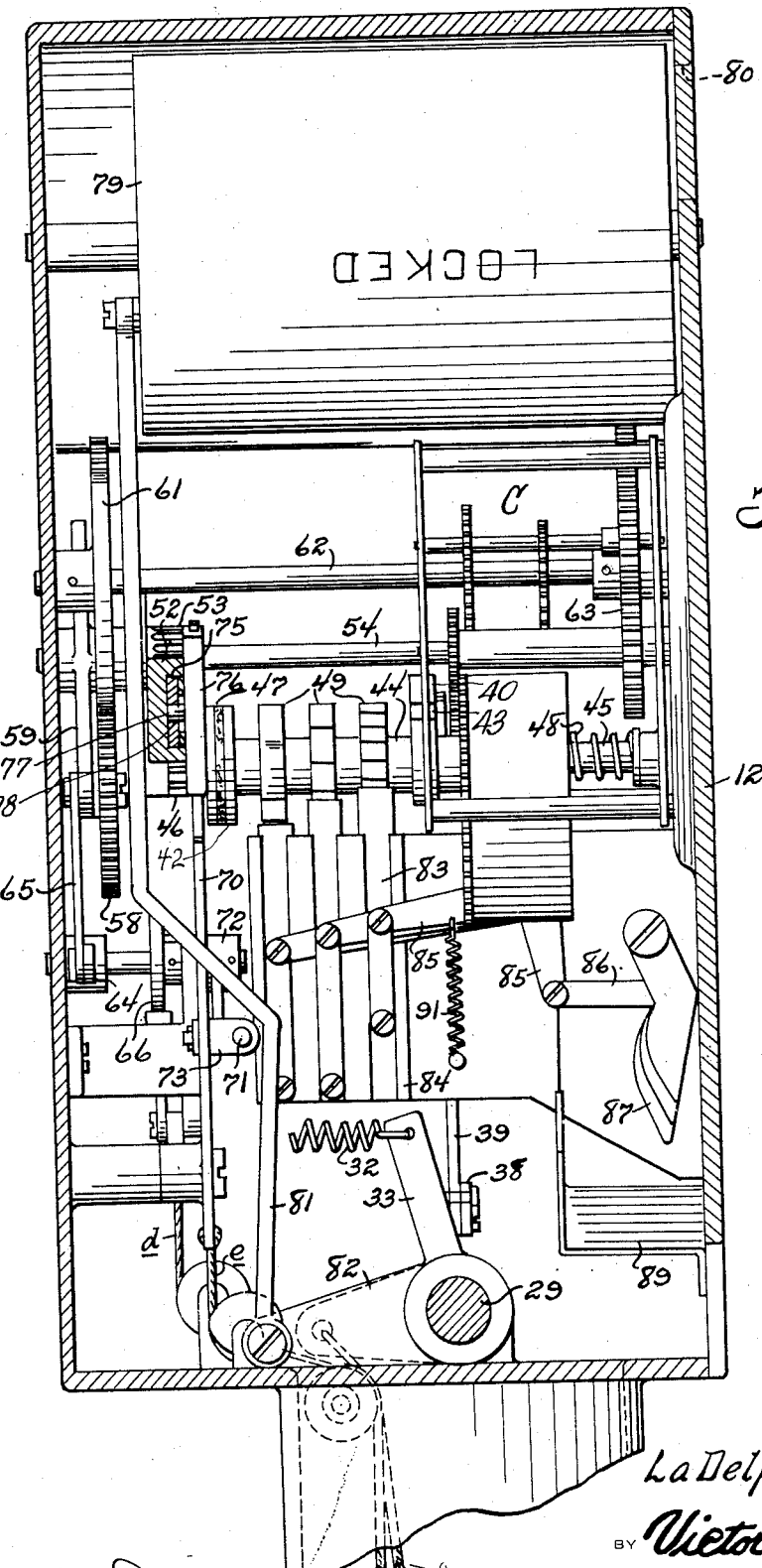
Figure 11 is a vertical sectional view through Figure 10, with most of the parts in elevation.
Figure 16:
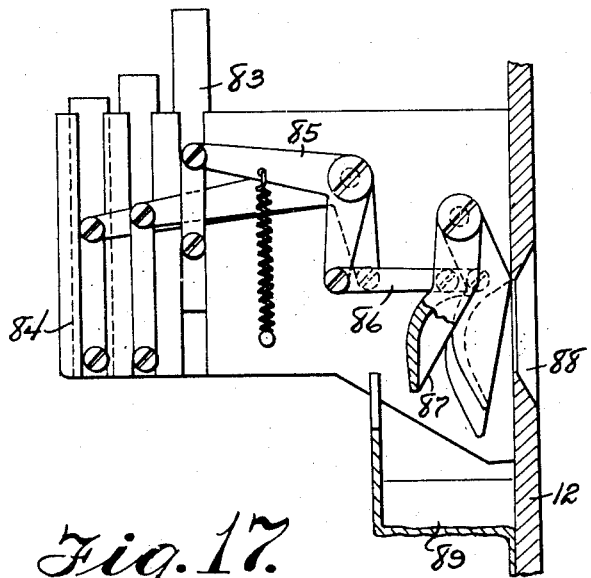
Figure 16 is a sectional view through the coin operated means.
Figure 17:
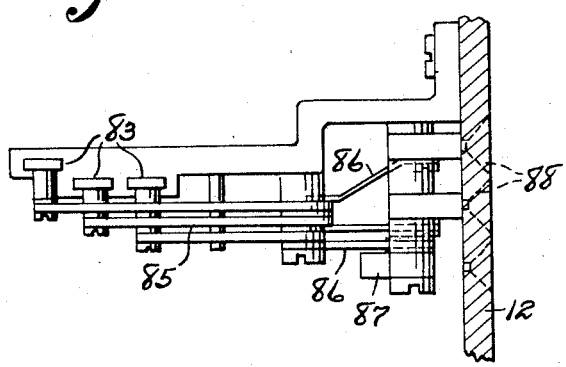
Figure 17 is a plan view of Figure 16.
Figure 19:
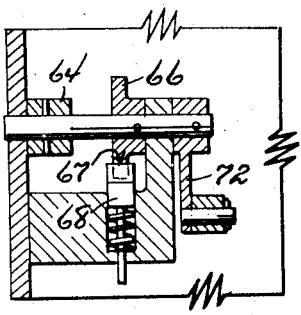
Figure 19 is a section on line 19—19 of Figure 12.
Figure 18:
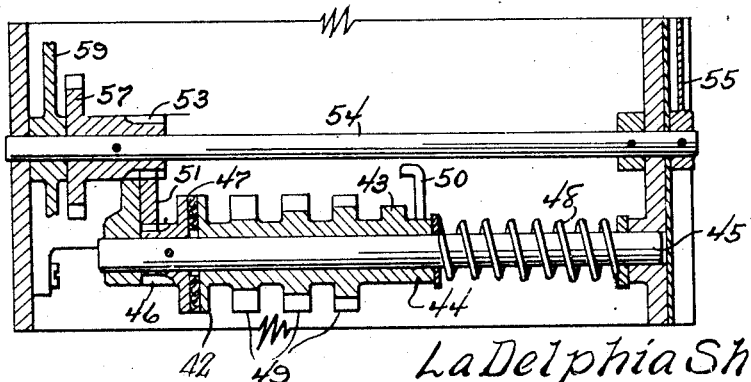
Figure 18 is a sectional detail view showing the cam and ratchet carrying shaft and the rack driven gear for rotating the same.

As shown in Figures 1, 2 and 3, the stalls A are arranged parallel to each other but it will be understood that they may be arranged on 45° angles or other angles from a road or a building line. The stalls are preferably provided with a concrete base 1 and the stalls are separated from each other by the horizontal bars 2 supported by the posts 3 which are embedded in the concrete. The two end posts are made of greater length than the intermediate posts and the front end post has a casing 4 fastened to its upper end which supports a gate 5 which is fastened to a hub 6 rotatably mounted on a shaft 7 within the casing. A spring 8 is fastened to the shaft and to the hub and tends to hold the gate in raised position. A flange 9 is formed on the hub and has a notch 10 therein which is adapted to be engaged by a spring latch 11 within the casing when the gate is moved to lowered position so as to lock the gate in this lowered position. The gate is provided with a flat part 5' which may contain the word "Vacant" so that the motorist can readily observe the vacant stalls as he approaches the parking place.

A casing 12 is fastened to the top of the rear post and contains mechanism hereinafter to be described and a casing 13 is embedded in the concrete and is in communication with one of the intermediate posts. This casing 13 contains a pedal member 14 at its front and a pedal member 15 at its rear, these members being normally held in raised position by the coiled springs 16. These members are so arranged that a vehicle entering and leaving the stall will engage the same and the weight of the vehicle will depress the said members. Each member has a depending lever 17 pivoted thereto which carries a pin 18 which engages a slot 19 in an inclined bracket 20 so that as the pedal member is depressed, the pin 18, sliding in the slot 19, will act to cause the lever 17 to swing outwardly as the member descends. The lever 17 of member 14 has connected thereto a cable c which passes over one of a number of pulleys 21 arranged on a shaft 22 at the center of the casing 13 and over one of a number of pulleys 23 arranged on a shaft 24 at the top of the post which is connected with the casing 13, and then the said cable passes through the tubular railing 2 into the casing 4 where it is connected to the inner end of the gate 5 by the pin 25, the cable passing over suitable guiding pulleys 26 in the casing.

Thus when a vehicle enters a stall, it will automatically close and lock the gate by depressing the member 14 which will exert a pull on the cable c, causing said cable to move the gate, against the action of its spring 8 to horizontal position and thus permit the bolt 11 to engage the notch 10 to lock the gate in lowered position. The member 15 is held against movement by the bolt 27 which is pinned to a spring pressed lever 28 which acts to hold the bolt in projected position with a part under the lower edge of the member 15. When the vehicle is to leave the stall, the operator pulls the hand lever 30 to rock the shaft 29 journaled in the casing 12 so as to exert a pull upon the cable a which passes through the railing and post over guiding pulleys 22 and 23 and has one end fastened to the lower end of the lever 28 so that the pull upon the said cable will cause the said lever to move against its spring and retract the bolt 27. Then when the vehicle starts to leave the stall, it will depress the member 15 so that the lever 17 will exert a pull upon the cable b which is attached to the lever and passes over guiding pulleys into the casing 4 where it is connected with a lever 31 which is attached to the bolt 11 and will retract the said bolt so that the spring 8 can raise the gate 5 to permit the vehicle to pass from the stall.

A spring 32 is fastened to an arm 33 and to a part of the casing, said arm being connected with the shaft 29 and tends to return the shaft and the hand lever 30 to normal position when a pawl 34 is disengaging a rack part 35 on the shaft 29, said pawl ratcheting over the teeth when the lever is pulled downwardly and engaging a tooth and preventing the return movement of the shaft and lever so that the bolt 27 remains in retracted position and permits the member 15 to be lowered by the passage of the vehicle over the same. A second rack part 36 is formed on the shaft 29 and this rack part is adapted to be engaged by a pawl 37 and the two pawls are connected to the ends of a lever 38 which is pivoted intermediate its ends to a part in the casing so that when the lever is rocked, one pawl will be moved into operative position and the other into inoperative position and vice versa. The lever is connected by a link 39 with a pawl 40 which is pulled downwardly by a spring 41, the beveled tooth of the pawl engaging the edge of a disk 42 which is provided with a cam 43. This cam will engage the tooth and force the pawl 40 upwardly and thus cause the link 39 to move the lever 38 so as to engage the pawl 34 with the ratchet 35 and free the ratchet 36 of the pawl 37, the latter being in normal position when engaged with said rack part 36, locking the shaft 29 against movement by the hand lever 30.

As will be seen from Figures 13, 14 and 15, the shaft 29 cannot be rocked by the hand lever 30 when the pawl 37 is in engagement with the ratchet 36, while the pawl 34, engaging the ratchet 35, will prevent the return movement of the shaft and hand lever when the pawl 40 is in raised position. The disk 42 is formed on a tubular shaft 44 which is rotatably mounted on a shaft 45 journaled in the casing 12 and the said shaft has a pinion 46 fastened thereto which is provided with a flange and a friction disk 47 is arranged between the said flange and a flange on the hollow shaft 44. A spring 48 on the shaft 45 presses the hollow shaft toward the pinion 46 so as to cause the hollow shaft to frictionally engage the disk 47 so that the said hollow shaft will be rotated with the pinion and shaft. A plurality of ratchet wheels 49 are formed on the hollow shaft 44 and a stop 50 is carried by the said hollow shaft for engaging the upper end of the link 39 to act as a stop for preventing the disk 42 from being moved rearwardly to an extent which would enable the cam 43 to pass beyond the tooth of the pawl 40 on the return movement of said cam 43.

The pinion 46 is engaged by a rack bar 51 mounted in a guideway 52 arranged in the casing 12, and the said rack bar is moved through means of a pinion 53 which is fastened to a shaft 54 which is journaled in the casing and which has one end projecting from the front of the casing, where it is provided with a finger 55 which cooperates with a dial 56 on the face of the casing to form a registering device for indicating the parking charge due for the vehicle in the stall.

The pinion 53 is formed with a gear 57 which is in mesh with an idle gear 58 which is carried by an arm 59 which is pivoted to the shaft 54 in such a manner that when it is rocked on said shaft by a spring 60 connecting its upper end with a part of the casing, the idle gear 58 will be caused to mesh with a segmental gear 61 which is fastened to a shaft 62 which also carries a gear 63 which is in mesh with the clock mechanism C, the dial of the clock being arranged on the face of the casing 12 adjacent the dial 56. Thus the clock mechanism will actuate the finger 55 of the meter or registering device when the gear 58 is in mesh with the gear 61 and the movement of the shaft 54 of the registering device will be communicated to the hollow shaft 44 through the rack and pinions and the frictional connection between the pinion 46 and the said hollow shaft 44.

An arm 64 is pivoted in the casing 12 and has its free end connected to the lower end of the arm 59 by the link 65 and the hub 66 of the said arm 64 carries a notch 67 which is adapted to be engaged by a spring latch 68 to hold the arm 59 in a position with the spring 60 under tension and the idle gear 58 out of engagement with the gear 61. A lever 69 is pivoted in the casing 12 and is attached to the latch 68 so that when the said lever is moved downwardly, the latch will be drawn out of the notch 67 so that the spring 68 can move the arm 59 to throw the gear 58 in mesh with the gear 61. A cable d is attached to the free end of the lever 69 and passes over suitable guiding pulleys through the post and horizontal tubing down through the intermediate post where it is connected with the cable c so that as the treadle member 14 is depressed, the cable c will close the gate and the cable d will release the meter operating means and permit them to move into operative engagement with the clock mechanism so that the meter and its cooperating parts will be thrown into operation.

A lever 70 is pivoted in the casing 12 and a cable e is fastened to its lower end and passes over suitable guiding pulleys and has its other end attached to the cable b which unlocks the gate when the treadle member 15 is depressed. This cable e will, at the same time, throw the lever 70 over to the right in Figure 12. A rod 71 is pivoted to an arm 72 depending from the hub 66 of the lever 64 and the said rod passes through an eye 73 on the lever 70. A spring 74 is arranged on the rod between the eye 73 and a shoulder on the pivoted end of the rod so that as the lever 70 moves toward the right, it will compress the spring and cause the same to move the arm 72 toward the right, thus throwing the lever 64 downwardly, and this movement of the lever 64 will, through the links 65, move the lever 59 downwardly against the action of its spring 60 and thus throw the gear 58 out of mesh with the gear 61 so that the meter and its cooperating parts will come to rest. The movement of the lever 70 also shifts the rack bar 51 to its original position to return the meter finger to zero position and also to return the cam 43 to its normal position to raise the pawl 40 which releases the hand lever 30 and its shaft 29 so that the same can be turned to normal position. This movement of the rack bar is performed by means of a block 75 slidably mounted in the guideway 52 and abutting the rack bar 51, said block being connected with the lever through means of a tubular slide 76 on the reduced upper end of the lever 70, said slide carrying a projection 77 which engages a hole 78 in the block 75.

A drum 79 is rotatably mounted in the top of the casing 12 and has indicia thereon for appearing at the windows 80 in the front and side of the casing. This drum is actuated through means of a pitman 81 which connects a crank pin on one end of the drum with an arm 82 on the shaft 29.

As shown in Figure 8, the dial 56 is divided into spaces, the first space being marked "Free" and the spaces being marked with the amounts due for the use of the stall for each hour that the vehicle remains therein, the first hour being free. Thus any time during the first hour the vehicle can be removed without paying anything, but after the vehicle has stayed in the stall over an hour, then a coin or coins must be dropped into the casing 12 before the parts can be operated to open the gate.

The coin operating means comprises a plurality of push bars 83 arranged in guideways 84 in the casing 12 and having their upper ends adapted to engage the toothed wheels 49 on the hollow shaft 44. Each push bar is pivoted to one end of a bell crank lever 85 and the other end of each lever is connected by a link 86 to a spoon-like member 87 pivoted in the casing. The bowls of these members 87 normally cover the coin slots 88 in the front of the casing 12 so that when a coin is inserted in any one of these slots, the member 87, covering the same, will be swung inwardly by the coin and this movement of the member will be communicated to the push bar 84 which is connected thereto by the bell crank 85 and link 86 so that the said push bar will be raised and the engagement of the upper end of the bar with one of the toothed wheels 49 will rotate the shaft 44 so as to return the cam 43 to its original position and thus lift the pawl 40, as before described. After the coin has pushed back the member 87, it will drop into a chute 89 which will lead it into the coin receptacle 90 in the bottom of the casing 12. Springs 91 attached to the bell cranks return the parts to their normal position.

When a vehicle is run into a stall, one of its front wheels, if the car is run in, or one of the rear wheels, if the car is backed in, will run over the treadle member 15, but as this member is locked in raised position by the bolt 27, it will not be affected but when the wheel passes over the treadle member 14, the said member will be depressed so that its lever 17 will pull, upon the cable c which will pull the gate downwardly to horizontal position and the latch 11, engaging the slot 10, will hold the gate in closed position. Thus the automobile is locked in the stall. At the same time, the cable d is pulled which will swing the lever 69 downwardly, thus releasing the latch 68 so as to permit the springs 60 to move the parts to place the gear 58 in engagement with the gear 61 and thus cause the clock mechanism to start up the registering device or meter. The rotation of the meter shaft will be communicated to the shaft 45 through the rack bar and the pinions and this movement of the shaft 45 will be communicated to the hollow shaft 44 through the friction clutch 47. Thus the cam 43 will be caused to travel from under the pawl 40, but with the parts arranged as shown in these drawings, the cam will not pass from under the pawl until an hour has elapsed, for the first hour of parking is free. After this first hour has elapsed, however, the cam will have passed from under the pawl so that the pawl will drop under the action of its spring and thus reverse the positions of the pawls 34 and 37 and in this position of the pawls, the shaft 29 cannot be moved by the hand lever 30, as shown in Figures 13, 14 and 15. When the pawls 34 and 37 are in a reverse position, with the pawl 40 raised, the shaft 29 can be moved by the lever 30, but the pawl 34 will prevent the shaft and its lever from being returned to their normal position. The shaft and hand lever are free to be moved any time within the first hour, while the pawl 40 is held in raised position by the cam 43, but as soon as the pawl 40 drops, then the shaft 29 is locked against movement. If the vehicle is to be moved out of this stall during the free period, it is simply necessary for the driver to pull the lever 30 forwardly, which will cause the shaft to rock to a position where it will exert a pull upon the cable a so that the said cable will shift the bolt lever 28 to retract the bolt from under the treadle member 15. The shaft 29 will be held in this position by the pawl 34 so that the bolt will remain retracted. This movement of the shaft 29 will also rock the drum 79 to bring the words "Drive out" or similar words in some of the windows. In the normal position of the drum, the words "Locked" or similar words are in front of the windows. The vehicle is then moved out of the stall and as one of its wheels passes over the treadle member 15, it will depress the same and thus cause the lever 17 of the said member 15 to exert a pull upon the cable b to cause the said cable to move the lever 31 downwardly to draw the latch 11 out of the notch 10 and thus permit the spring 8 to move the gate 5 to open position. At the same time, the cable e will throw the lever 78 to the right in Figure 12, thus moving the arm or lever 59 downwardly through means of the compression of the spring 74 which will permit the latch 66 to engage the notch 67 so that the arm 56 will remain in its lowered position. The lever 78 will also shift the rack bar 51 back to its original position and the movement of this rack will turn the meter shaft to bring the meter finger to zero and the said rack will also rotate the shafts 44 and 45 to return the cam 43 to its original position. As before stated, the stop 50 prevents the cam being moved backwardly too far. It will be seen that the shaft 29 and the lever remain locked in their forward positions after the vehicle has left the stall, but this does not matter, for when another vehicle passes into the stall, it will simply lower the treadle part 15 and then it passes over the treadle part 14 which will close and lock the gate and start up the registering mechanism. If this vehicle stays in over the free hour, then the cam will pass from under the pawl 40 so that the position of the pawls 36 and 37 will be reversed and then the spring 32 will return the shaft 29 and the lever 30 to their normal positions. While the shaft and lever remain in their forward positions, the legend "Drive out" will appear at each window, but when the lever is in its retracted position, the word "Locked" will appear at each window so that the driver will know he must shift the lever before he can drive out.

When the vehicle remains over the free hour, the cam will move from under the pawl 40 as soon as the first hour has passed so that the pawl 37 will lock the shaft 29 against movement and it will then be impossible for the operator of the vehicle to move the lever to unlock the gate until he has placed the proper coin in the casing 12. The finger 55 will indicate the sum to be placed in the slot or slots and as the coins are pushed into the slots, they will operate the members 87 to cause them to move the push bars and thus rotate the hollow shaft 44 on the shaft 45 to bring the cam back under the pawl 40 to cause the said pawl to lift the pawl 37. As soon as this is done, the handle can be moved forwardly to rock the shaft 29 and thus cause the raising of the gate and the stopping of the registering mechanism, as before explained.

It will, of course, be understood that the push bars operate the hollow shaft to varying degrees and according to the size of the coin placed in the device.

The face of the casing is provided with instructions for operating the device, as shown in Figure 8, and I prefer to make the gear 61 of such form that it will operate the registering device for but twelve hours out of the twenty-four, so that during the night, the apparatus will not work and the stall can be used without payment. However, the device can be made to work the full twenty-four hours, if desired, as will be understood.

The amount of free time may be changed by altering cam 43 and of course the rate may be changed by altering gears 49 and a suitable dial.

It is to be understood that the depositing of the correct denominations in the slot or slots will only leave gate in a condition to be opened by car leaving stall for a very limited, say 1 to 3 minutes, time as the cam 43 will travel from under pawl 40 and as before described lock stall, and time will begin registering again if car is still in stall, but if car leaves stall the rack bar 51 will reset finger 55 and the cam 43 to zero.

What I claim is:—

1. A parking stall for automobiles comprising a normally open gate for closing the stall, means operated by a vehicle entering the stall for closing the gate, means for locking the gate in closing position, means operated by the vehicle leaving the stall for actuating the locking means to release the gate, and a coin or token controlled means for locking the last-named means.

2. A parking stall for a vehicle comprising a gate for closing the stall, a spring for normally holding the gate in open position, a latch for holding the gate in closed position, a treadle member operated by a vehicle entering the stall, a flexible member connecting the treadle member with the gate so that as the member is depressed the gate will be closed, a second treadle member operated by the vehicle leaving the stall, a flexible member connecting the last-named treadle member with the latch so that the gate will be unlocked as the said vehicle leaves the stall, and coin or token controlled means for freeing the second treadle member.

3. A parking system for a vehicle comprising a normally open gate for closing a stall, locking means for holding the gate closed, means operated by a vehicle entering the stall for closing the gate, means operated by the vehicle leaving the stall for actuating the locking means to release the gate, means for registering the time the vehicle remains in the stall, means associated with the gate closing means for throwing the registering mechanism into operation, means associated with the third-named means for throwing the registering mechanism out of operation, and coin controlled means for freeing the third-named means.

4. A parking system for a vehicle comprising a normally open gate for closing the stall, locking means for holding the gate closed, means operated by a vehicle entering the stall for closing the gate, means operated by a vehicle leaving the stall for operating the locking means to release the gate, means for registering the time the vehicle remains in the stall, means associated with the gate closing means for throwing the registering mechanism into operation, means associated with the third-named means for throwing the registering mechanism out of operation, locking means for holding the third-named means against actuation by the vehicle, manually operated means for releasing the last-named locking means and coin controlled means for controlling the operation of the manual means.

5. A parking system for a vehicle comprising a normally open gate for closing the stall, locking means for holding the gate closed, means operated by a vehicle entering the stall for closing the gate, means operated by a vehicle leaving the stall for operating the locking means to release the gate, means for registering the time the vehicle remains in the stall, means associated with the gate closing means for throwing the registering mechanism into operation, means associated with the third-named means for throwing the registering mechanism out of operation, locking means for holding the third-named means against actuation by the vehicle, manually operated means for releasing the last-named locking means, coin controlled means for controlling the operation of the manual means and indicating means for indicating when the manually operated means must be operated and when it is unnecessary to operate such manually operated means.

6. A parking system for a vehicle comprising a normally open gate for closing the stall, locking means for holding the gate closed, means operated by a vehicle entering the stall for closing the gate, means operated by a vehicle leaving the stall for operating the locking means to release the gate, means for registering the time the vehicle remains in the stall, means associated with the gate closing means for throwing the registering mechanism into operation, means associated with the third-named means for throwing the registering mechanism out of operation, locking means for holding the third-named means against actuation by the vehicle, manually operated means for releasing the last-named locking means, coin controlled means for controlling the operation of the manual means, indicating means for indicating when the manually operated means must be operated and when it is unnecessary to operate such manually operated means and clock mechanism for operating the registering means.

7. A parking stall for a vehicle comprising a normally open gate, means for locking the gate in closed position, a treadle member operated by a vehicle entering the stall for closing the gate, a second treadle member operated by the vehicle leaving the stall for actuating the locking means to release the gate, coin or token controlled means for freeing the second treadle member, registering mechanism for registering the amount of time the vehicle stays in the stall, means operated by the first treadle member for throwing such means into operation, means operated by the second treadle member for moving the registering mechanism out of operation, and means operated by said second treadle member for returning the registering mechanism to zero position.

8. A parking stall for a vehicle comprising a normally open gate, means for locking the gate in closed position, a treadle member operated by a vehicle entering the stall for closing the gate, a second treadle member operated by the vehicle leaving the stall for actuating the locking means to release the gate, coin or token controlled means for freeing the second treadle member, registering mechanism for registering the amount of time the vehicle stays in the stall, means operated by the first treadle member for throwing such means into operation, means operated by the second treadle member for moving the registering mechanism out of operation, means operated by said second treadle member for returning the registering mechanism to zero position, a lock for preventing movement of the second treadle member by a vehicle, and manually operated means for retracting the said lock and coactive with the coin or token controlled means.

9. A parking stall for a vehicle comprising a normally open gate, means for locking the gate in closed position, a treadle member operated by a vehicle entering the stall for closing the gate, a second treadle member operated by the vehicle leaving the stall for actuating the locking means to release the gate, coin or token controlled means for freeing the second treadle member, registering mechanism for registering the amount of time the vehicle stays in the stall, means operated by the first treadle member for throwing such means into operation, means operated by the second treadle member for moving the registering mechanism out of operation, means operated by said second treadle member for returning the registering mechanism to zero position, a lock for preventing movement of the second treadle member by a vehicle, manually operated means for retracting the said lock and coactive with the coin or token controlled means, and means actuated by the operation of the manual means for indicating when the manual means must be operated.

10. A parking stall for a vehicle comprising a normally open gate, means for locking the gate in closed position, a treadle member operated by the vehicle entering the stall for closing the gate, a second treadle member operated by the vehicle leaving the stall for operating the locking means to release the gate, registering mechanism for registering the amount of time the vehicle stays in the stall, means operated by the first treadle for throwing such means into operation, means operated by the second treadle for moving the registering means out of operation, means operated by the second treadle for returning the registering mechanism to zero position, a lock for preventing movement of the second treadle by a vehicle, manually operated means for retracting the lock and coin controlled means for preventing movement of the manual means until such means are actuated by a coin.

11. A parking stall comprising a gate, a spring for holding the same in open position, locking means for holding the gate in closed position, a treadle actuated by a vehicle entering the stall for closing the gate, a second treadle operated by a vehicle leaving the stall for operating the locking means to release the gate, registering mechanism for indicating the amount of time the vehicle remains in the stall, clock mechanism for operating the registering mechanism, means actuated by the first treadle for connecting the clock mechanism with the registering mechanism, means operated by the second treadle for disconnecting the clock mechanism from the registering mechanism, a lock for preventing movement of the second treadle, manually operated means for moving the lock to releasing position, means for preventing movement of the manually operated means and coin controlled means for operating the preventing means to release the manually operated means.

12. A parking stall comprising a gate, a spring for holding the same in open position, locking means for holding the gate in closed position, a treadle actuated by a vehicle entering the stall for closing the gate, a second treadle operated by a vehicle leaving the stall for operating the locking means to release the gate, registering mechanism for indicating the amount of time the vehicle remains in the stall, clock mechanism for operating the registering mechanism, means actuated by the first treadle for connecting the clock mechanism with the registering mechanism, means operated by the second treadle for disconnecting the clock mechanism from the registering mechanism, a lock for preventing movement of the second treadle, manually operated means for moving the lock to releasing position, means for preventing movement of the manually operated means after a vehicle has remained in the stall for a certain period and coin controlled means for operating the preventing means to release the manually operated means.

13. A parking stall comprising a gate, a spring for holding the same in open position, locking means for holding the gate in closed position, a treadle actuated by a vehicle entering the stall for closing the gate, a second treadle operated by a vehicle leaving the stall for operating the locking means to release the gate, registering mechanism for indicating the amount of time the vehicle remains in the stall, clock mechanism for operating the registering mechanism, means actuated by the first treadle for connecting the clock mechanism with the registering mechanism, means operated by the second treadle for disconnecting the clock mechanism from the registering mechanism, a lock for preventing movement of the second treadle, manually operated means for moving the lock to releasing position, means for preventing movement of the manually operated means after a vehicle has remained in the stall for a certain period, coin controlled means for operating the preventing means to release the manually operated means and means actuated by the manually operated means for indicating when such means are locked or unlocked.

LA DELPHIA SHINN.